(12) United States Patent
Getsoian et al.

(10) Patent No.: US 12,427,477 B2
(45) Date of Patent: Sep. 30, 2025

(54) HIGH ENTROPY RARE EARTH OXIDES FOR EMISSIONS CONTROL

(71) Applicant: Ford Global Technologies, LLC, Dearborn, MI (US)

(72) Inventors: Andrew Getsoian, Canton, MI (US); Jason Wu, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 792 days.

(21) Appl. No.: 17/648,520

(22) Filed: Jan. 20, 2022

(65) Prior Publication Data
US 2023/0226490 A1     Jul. 20, 2023

(51) Int. Cl.
*B01D 53/94*  (2006.01)
*B01J 20/02*  (2006.01)
*F01N 3/10*   (2006.01)

(52) U.S. Cl.
CPC ......... *B01D 53/9445* (2013.01); *F01N 3/101* (2013.01); *B01D 2255/1023* (2013.01);
(Continued)

(58) Field of Classification Search
CPC .............. B01D 53/9445; B01D 53/945; B01D 53/9454; B01D 2255/1023; B01D 2255/80; B01D 2255/908; B01D 2255/1021; B01D 2255/1025; B01D 2255/206; B01D 2255/2092; B01D 2255/407; B01D 2251/10; B01D 2257/404; B01D 2257/502; B01D 2257/702; B01D 2258/01; B01J 20/0207; B01J 23/10; B01J 23/44; B01J 23/464; B01J 23/63; B01J 37/0215; B01J 2523/35; B01J 2523/36; B01J 2523/37; B01J 2523/3706; B01J 2523/3712; B01J 2523/3718; B01J 2523/3725; B01J 2325/3737; B01J 2523/3743; B01J 2523/375; B01J 2523/3756; B01J 2523/3762; B01J 2523/3768; B01J 2523/3775; B01J 2523/3787; B01J 2523/3793; B01J 2523/48; B01J 2523/49;
(Continued)

(56) References Cited

U.S. PATENT DOCUMENTS 6,326,329 B1 * 12/2001 Nunan ................. B01J 23/10
                                                502/263
8,568,675 B2  10/2013 Deeba et al.
(Continued)

FOREIGN PATENT DOCUMENTS

EP    3708541 A1    9/2020

OTHER PUBLICATIONS

Riley, C. et al., "A High Entropy Oxide Designed to Catalyze CO Oxidation Without Precious Metals," ACS Applied Materials & Interfaces, vol. 13, No. 7, Feb. 10, 2021, 9 pages.

*Primary Examiner* — Dapinder Singh
(74) *Attorney, Agent, or Firm* — Vincent Mastrogiacomo; McCoy Russell LLP

(57) ABSTRACT

Methods and systems are provided for an emissions aftertreatment device. In one example, the emissions aftertreatment device may include a catalyst and a high entropy oxygen storage material formed of at least five metal oxides in equal molar proportions. The at least five metal oxides includes one or more rare earth metals as well as other metals with similar chemical properties as the rare earth metals.

17 Claims, 11 Drawing Sheets

(52) U.S. Cl.
CPC .... *B01D 2255/80* (2013.01); *B01D 2255/908* (2013.01); *B01J 20/0207* (2013.01); *B01J 2523/35* (2013.01); *B01J 2523/36* (2013.01); *B01J 2523/37* (2013.01); *B01J 2523/3706* (2013.01); *B01J 2523/3712* (2013.01); *B01J 2523/3718* (2013.01); *B01J 2523/3725* (2013.01); *B01J 2523/3737* (2013.01); *B01J 2523/3743* (2013.01); *B01J 2523/375* (2013.01); *B01J 2523/3756* (2013.01); *B01J 2523/3762* (2013.01); *B01J 2523/3768* (2013.01); *B01J 2523/3775* (2013.01); *B01J 2523/3787* (2013.01); *B01J 2523/3793* (2013.01); *B01J 2523/48* (2013.01); *B01J 2523/49* (2013.01); *F01N 2370/02* (2013.01)

(58) Field of Classification Search
CPC .... F01N 3/101; F01N 3/0864; F01N 2370/00; F01N 2570/16; C04B 35/50; C04B 35/505; C04B 2235/3224; C04B 2235/3227; C04B 2235/3229; Y02A 50/20; Y02T 10/12

See application file for complete search history.

(56) References Cited

U.S. PATENT DOCUMENTS

| | | | |
|---|---|---|---|
| 2002/0032124 A1* | 3/2002 | Tan | B01D 53/945 502/303 |
| 2002/0061816 A1* | 5/2002 | Uenishi | B01D 53/945 502/304 |
| 2003/0126804 A1* | 7/2003 | Rosenflanz | C03C 1/00 501/78 |
| 2009/0107124 A1* | 4/2009 | Yamada | B01D 53/945 60/299 |
| 2013/0236380 A1* | 9/2013 | Golden | B01J 37/0244 502/340 |
| 2015/0196902 A1* | 7/2015 | Golden | B01J 37/0201 423/213.2 |
| 2017/0016367 A1* | 1/2017 | McGinn | B01D 53/944 |
| 2018/0318804 A1* | 11/2018 | Hatfield | B01J 37/0201 |
| 2022/0074035 A1* | 3/2022 | Yao | C22F 1/14 |
| 2022/0134316 A1* | 5/2022 | Chou | C01B 32/40 423/263 |

* cited by examiner

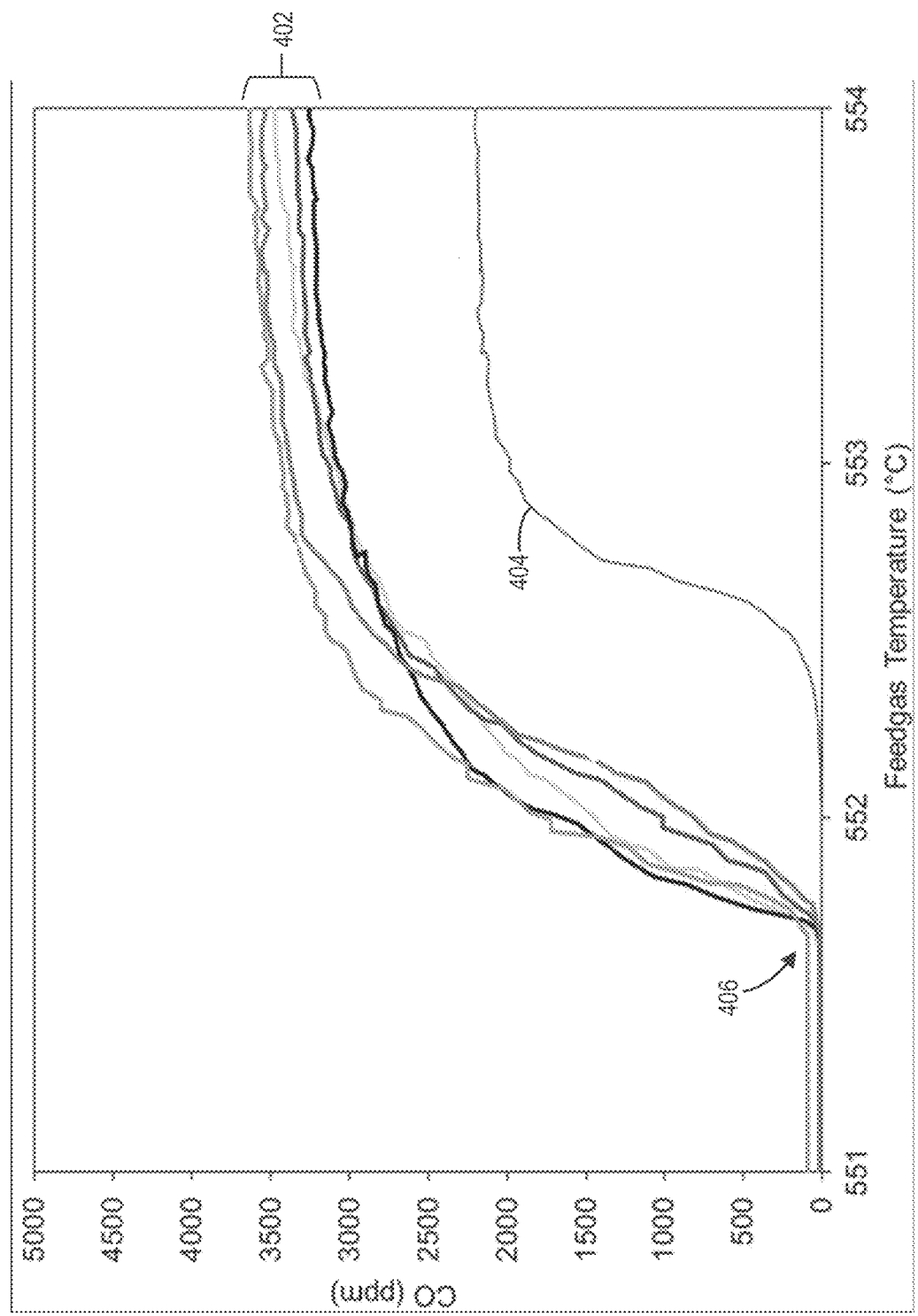

HIGH ENTROPY RARE EARTH OXIDES FOR EMISSIONS CONTROL

FIELD

The present description relates generally to an emissions aftertreatment system.

BACKGROUND/SUMMARY

A three-way catalyst may be included in an emissions aftertreatment system to treat emissions from an internal combustion (IC) engine. The three-way catalyst may facilitate reduction and oxidation reactions, thereby oxidizing carbon monoxide (CO) and hydrocarbons (HC) to carbon dioxide ($CO_2$) and water, as well as reducing nitrogen oxides ($NO_x$) to nitrogen gas ($N_2$). Completion of the redox reactions may depend on an amount of oxygen present in the aftertreatment device. As such, the three-way catalysts may be optimized according to an air-fuel ratio (AFR) of combustion at the engine. However, the AFR may fluctuate during vehicle operation to accommodate changes in operating conditions.

To compensate for such fluctuations to the AFR, the three-way catalyst may include an oxygen storage material. The oxygen storage material may be a sink for excess oxygen if the AFR increases, e.g., above stoichiometry. Conversely, the oxygen storage material may release stored oxygen if the AFR decreases, e.g., below stoichiometry. Conventional oxygen storage materials may include mixed oxides of ceria and zirconia, in which cerium is an active material and changes oxidation state to reversibly store or release oxygen. Zirconium may provide structural stability and enhanced oxygen diffusion. The oxygen storage materials are may be subjected to high temperatures, such as above 900° C., over a lifetime of a vehicle and as such, may degrade over time. As the oxygen storage materials degrade, their capacity for oxygen storage may decrease, as well as a rate at which oxygen can be stored and released. As such, there is a need for more robust oxygen storage materials.

Other attempts to address prolonging the useful lifetime of oxygen storage materials include incorporation of lanthanide oxides in addition to the zirconium and cerium mixed oxides. One example approach is shown by Deeba et al. in U.S. Pat. No. 8,568,675. Therein, one or more rare earth oxides are incorporated into an aftertreatment device as an oxygen storage material to improve long term stability of the oxygen storage material. Up to four different rare earth oxides may form the oxygen storage material, including ceria, as well as zirconia. The rare earth oxides may be incorporated at between 2% to 15% by weight resulting in unequal molar amounts of rare earth metals forming the rare earth oxides of the oxygen storage material.

However, the inventors herein have recognized potential issues with such materials. As one example, while incorporation of the one or more rare earth oxides may demonstrate increased catalyst dispersion and redox reaction activities (relative to other conventional materials such as alumina), more than 50% of material by weight is formed of zirconium and cerium. As such, the oxygen storage materials may be subject to degradation upon exposure to conditions associated with an exhaust system, thereby expediting loss of performance of the three-way catalyst.

In one example, the issues described above may be addressed by an emissions aftertreatment device, including a catalyst, a high entropy oxygen storage material formed of at least five metal oxides in equal stoichiometric (e.g., equal molar) proportions, the at least five metal oxides including one or more rare earth metals. In this way, a more robust oxygen storage material may prolong the useful life of the emissions aftertreatment device.

As one example, the high entropy oxygen storage material may have an internal entropy that increases a thermodynamic stability of the material relative to conventional oxygen storage materials including fewer or lower amounts of different metal oxides, allowing the material increase a conversion efficiency of a three-way catalytic converter. A water gas shift reaction may be facilitated by the high entropy oxygen storage material, which may enhance oxidation of CO. Additionally, the high entropy oxygen storage material may be applied to a catalyst support as a washcoat in a manner similar to current oxygen storage materials, thereby allowing the material to be incorporated into the emissions aftertreatment device without incurring additional manufacturing complexity and costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 shows a plot of CO emissions relative to feedgas temperature for the high entropy rare earth metal oxide oxygen storage material and a reference material.

DETAILED DESCRIPTION

Figure 2:
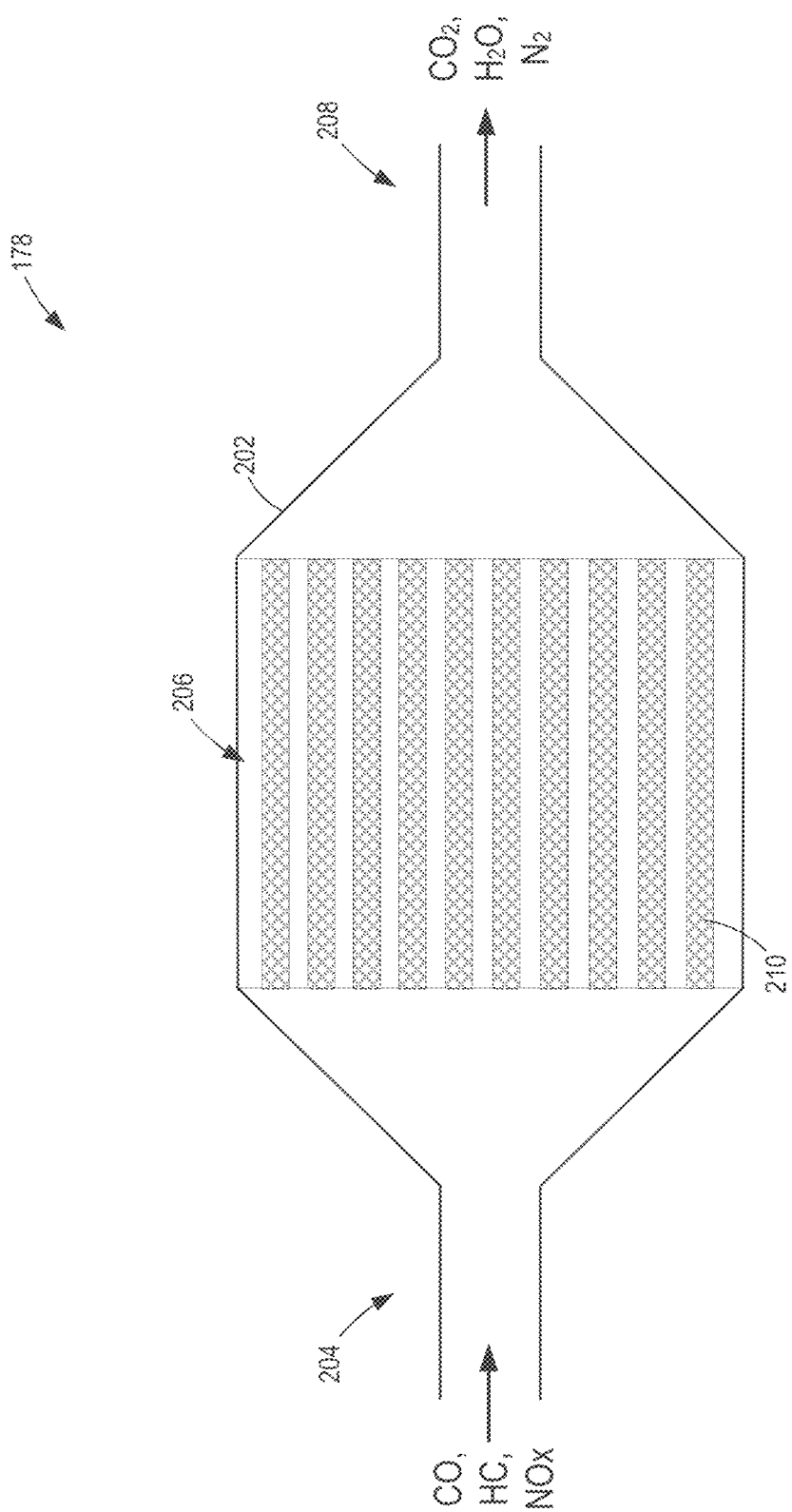
FIG. 2 shows an example of the emissions aftertreatment device of FIG. 1.
Figure 3A:
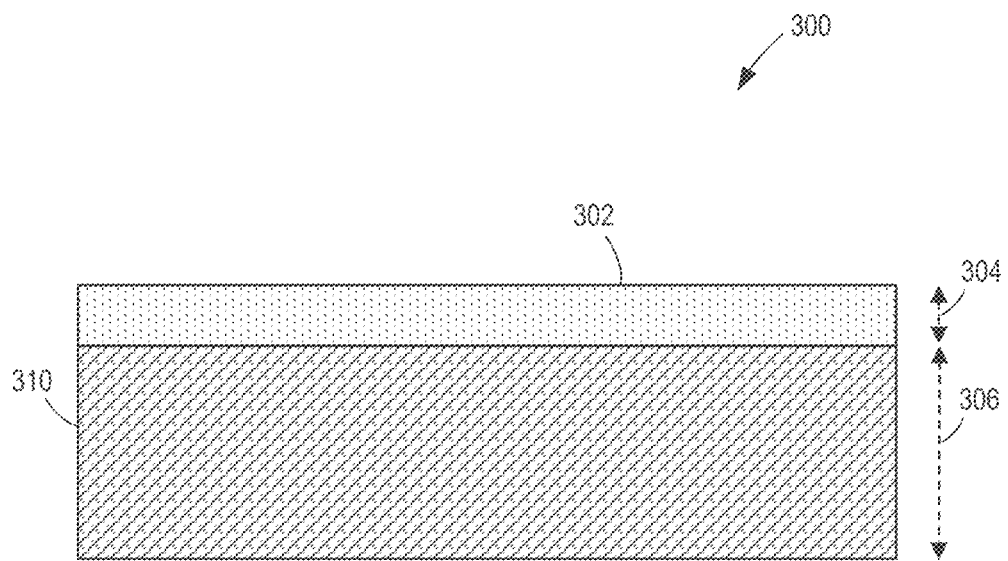
FIG. 3A shows an example of a first embodiment of a catalyst brick of the emissions aftertreatment device, the catalyst brick including a high entropy rare earth metal oxide oxygen storage material.
Figure 3B:
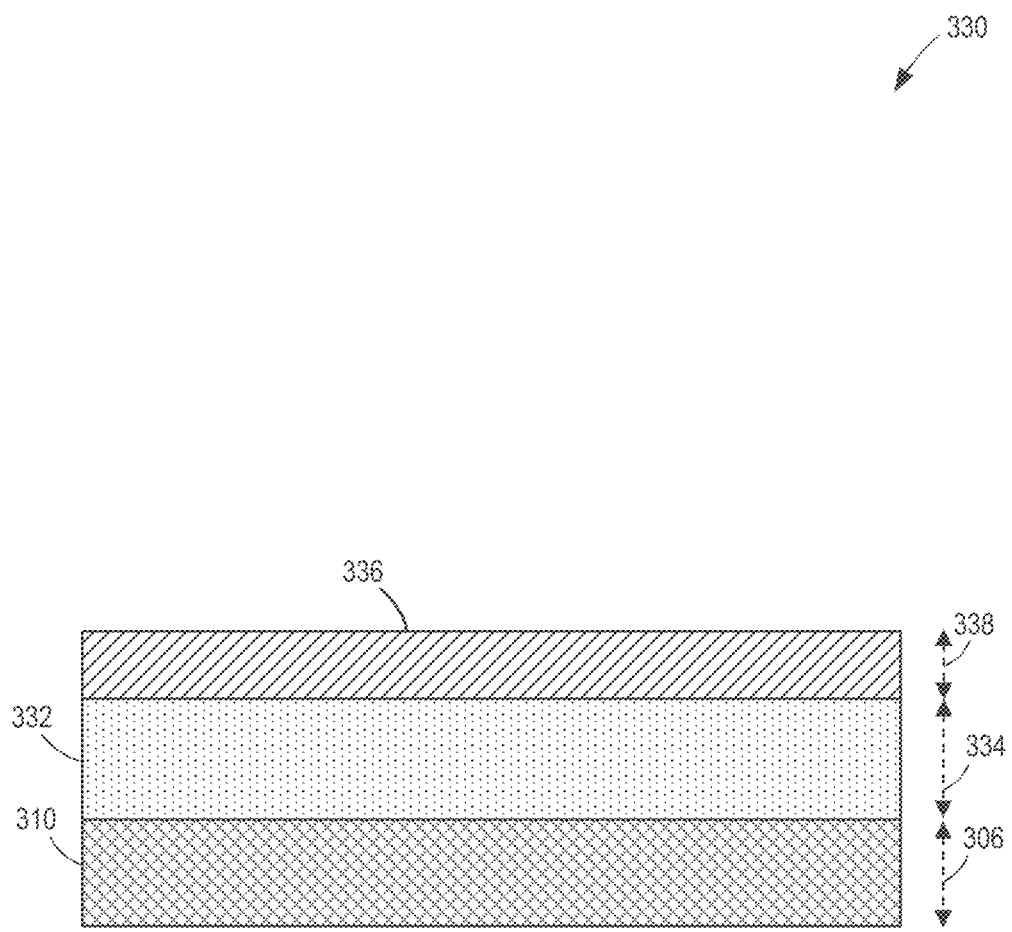
FIG. 3B shows an example of a second embodiment of a catalyst brick of the emissions aftertreatment device, the catalyst brick including a high entropy rare earth metal oxide oxygen storage material.
Figure 3C:
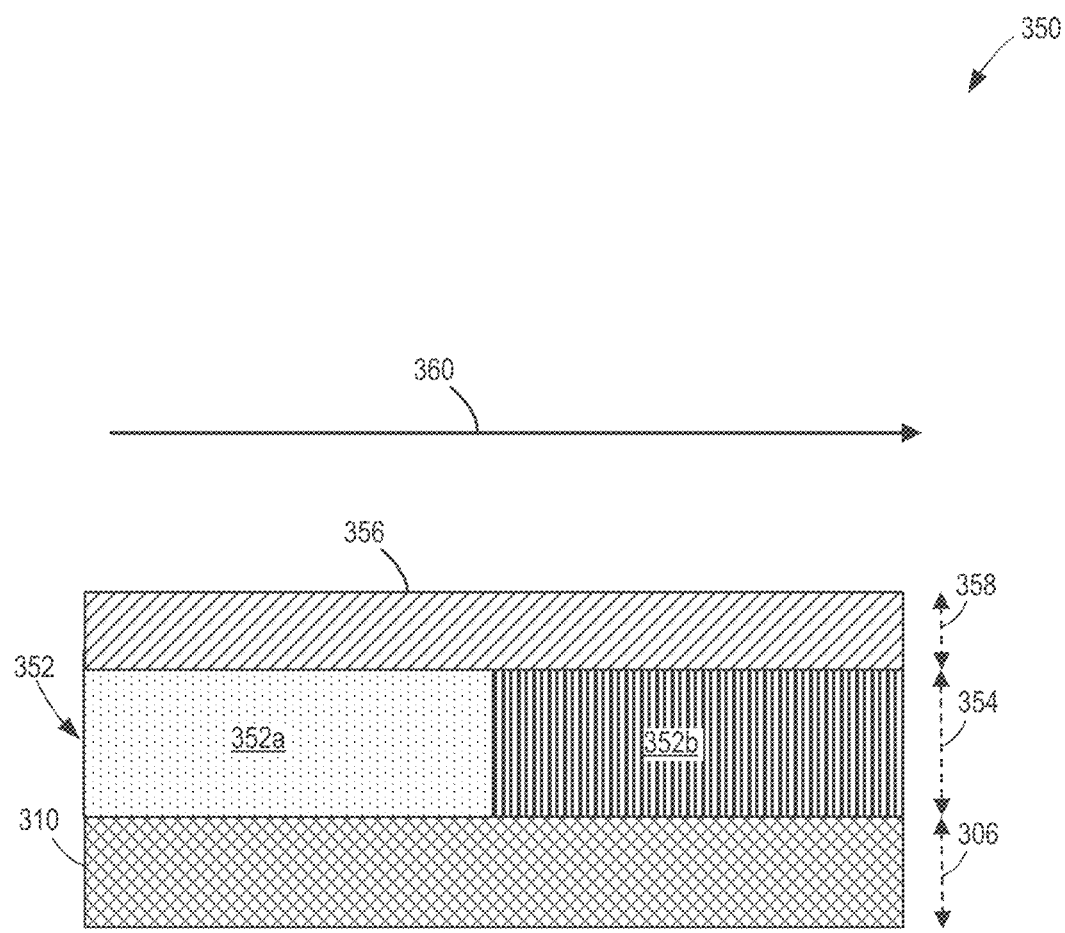
FIG. 3C shows an example of a third embodiment of a catalyst brick of the emissions aftertreatment device, the catalyst brick including a high entropy rare earth metal oxide oxygen storage material.
Figure 5:
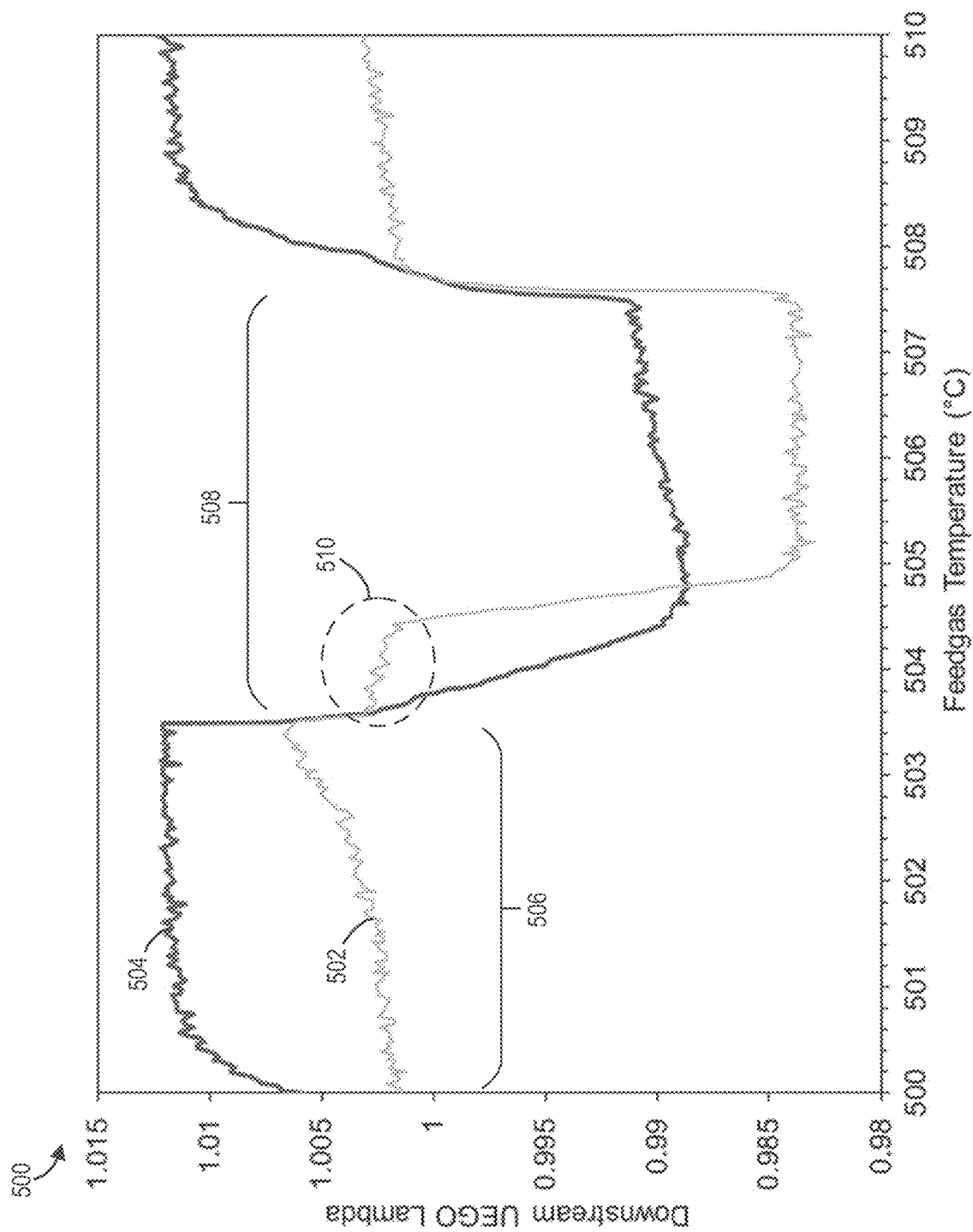
FIG. 5 shows a plot of lambda relative to feedgas temperature for the high entropy rare earth metal oxide oxygen storage material and the reference material.
Figure 6A:
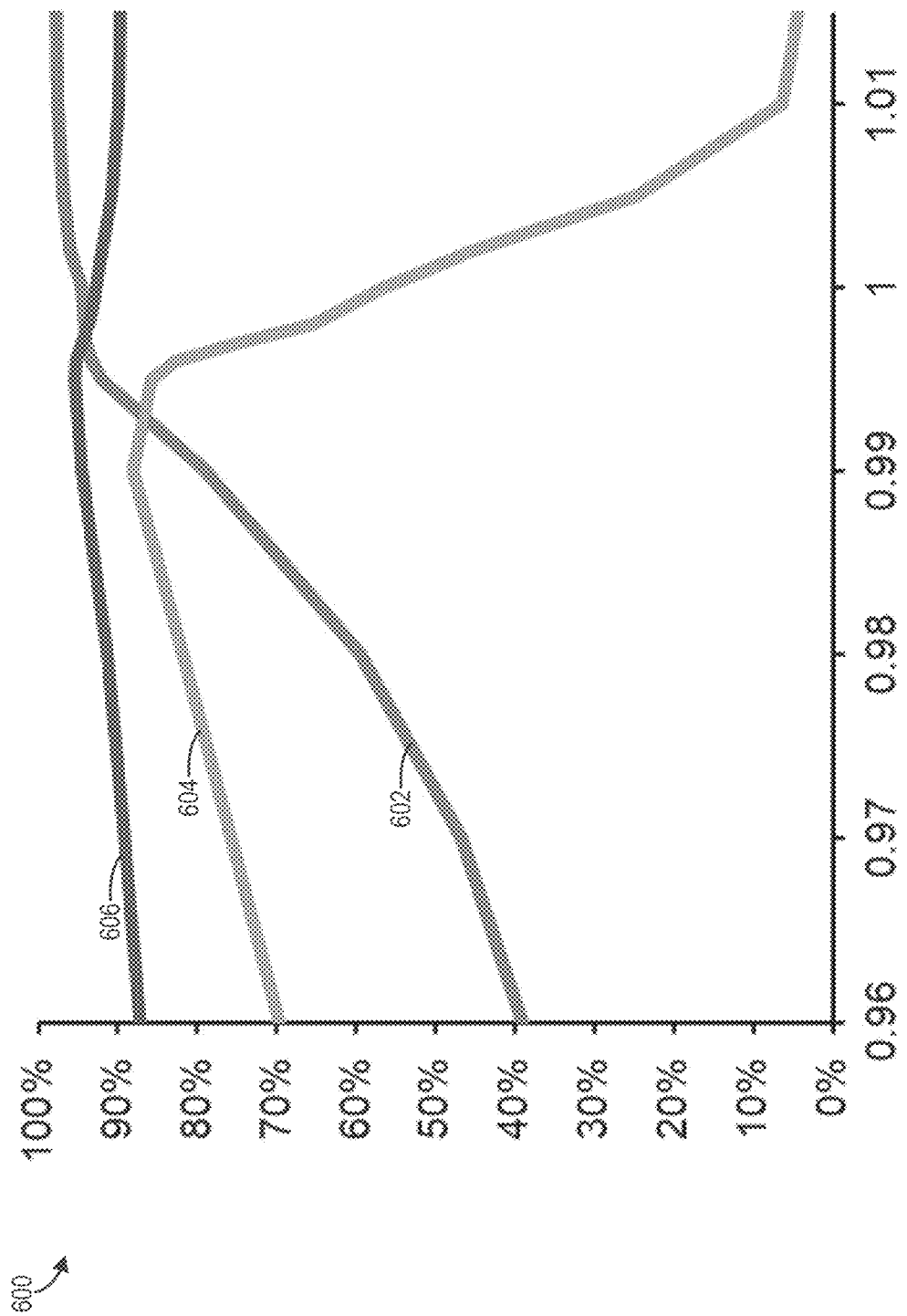
FIG. 6A shows a plot of emissions relative to AFR for the reference material.
Figure 6B:
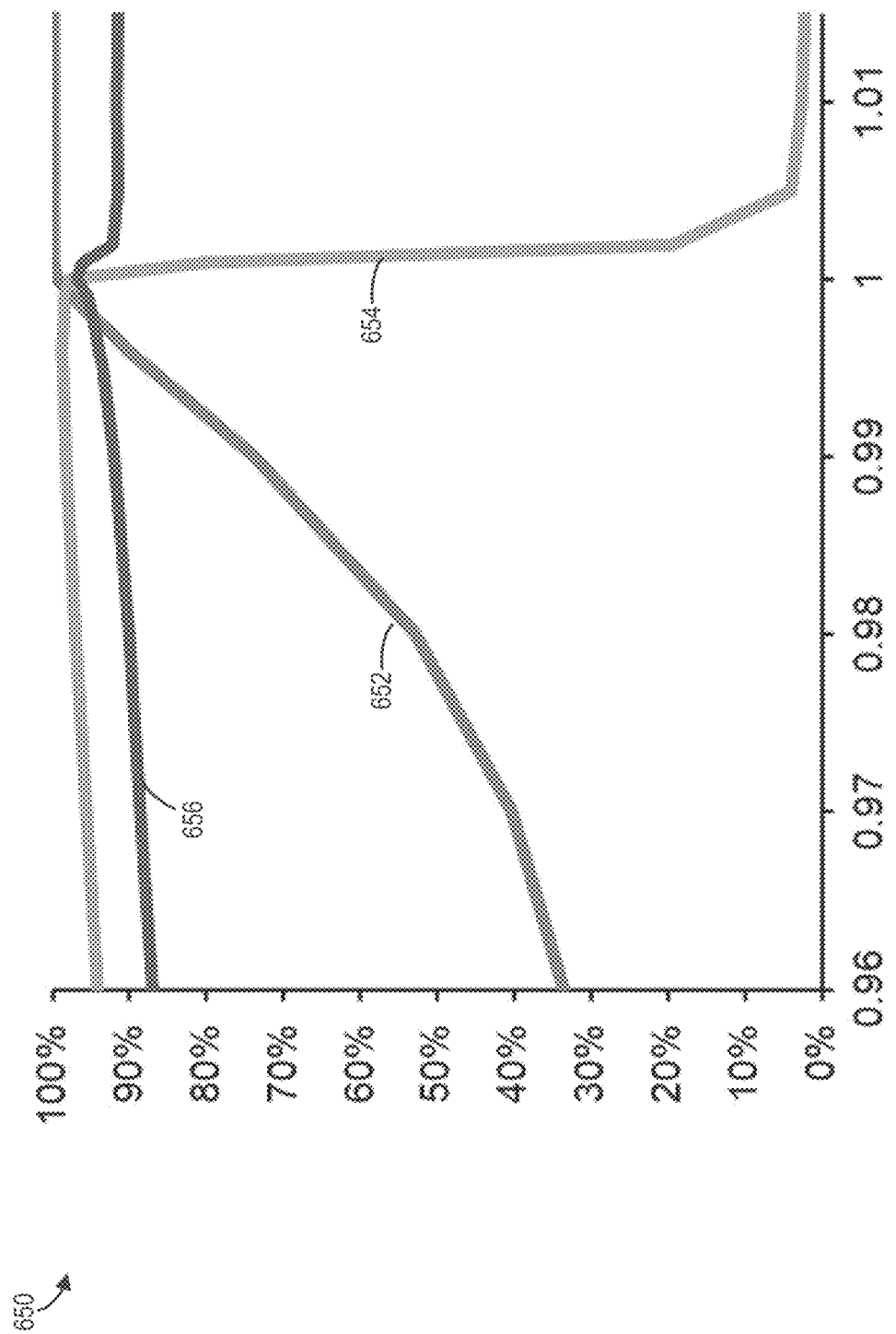
FIG. 6B shows a plot of emissions relative to AFR for the high entropy rare earth metal oxide oxygen storage material.

The following description relates to an oxygen storage material used for automotive emissions control. In one example, the oxygen storage material may include high entropy rare earth metal oxides (hereafter, high entropy oxygen storage material). The high entropy oxygen storage material may be used in a three-way catalyst for an emissions aftertreatment device. An example of the emissions aftertreatment device is included in an engine system depicted in FIG. 1. Further details regarding an emission control device are illustrated in FIG. 2. By incorporating the high entropy oxygen storage material into the emissions aftertreatment device, an activity of oxidation and reduction reactions occurring at the emissions aftertreatment device may be maintained over a longer duration, despite exposure of the high entropy oxygen storage material to harsh conditions. Exemplary embodiments of a catalyst brick for the emissions aftertreatment device, the catalyst brick including the high entropy oxygen storage material, are illustrated in FIGS. 3A-3C. Comparisons of a performance of the high entropy oxygen storage material relative to a conventional oxygen storage material are shown in FIGS. 4-6B. For example, control of CO emissions is illustrated in a first graph in FIG. 4 and an effect of the respective oxygen storage materials on lambda is shown in a second graph in FIG. 5. A conversion efficiency of each oxygen storage material is depicted in FIGS. 6A-6B. The physical properties of the high entropy oxygen storage material are further shown through illustration in FIG. 7 and by powder x-ray diffraction in FIG. 8.

Figure 1:
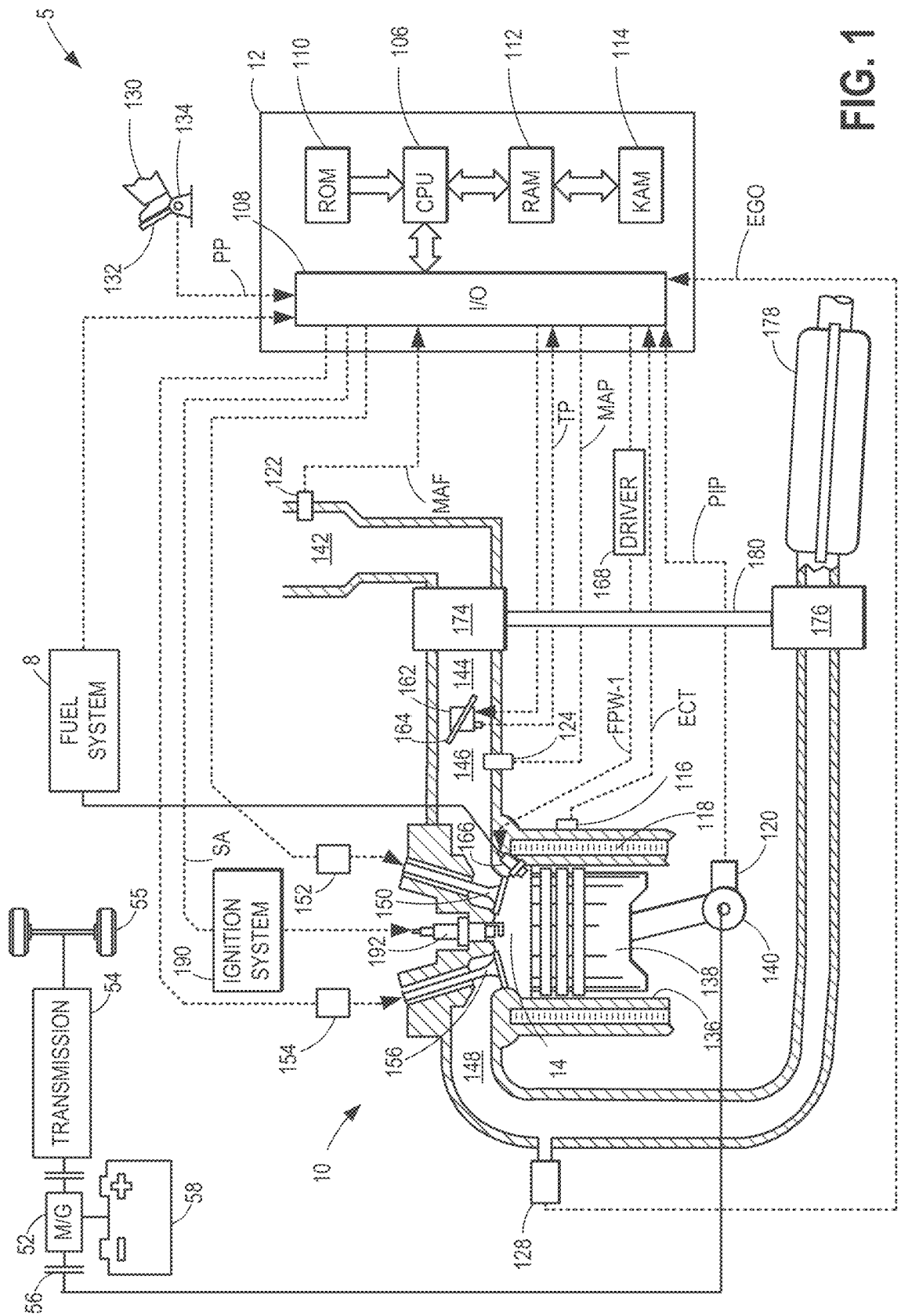
FIG. 1 shows a schematic diagram of an example cylinder of a multi-cylinder engine with an emissions aftertreatment device.

Turning now to FIG. 1, an example of a cylinder 14 of internal combustion engine 10 is shown, where the engine 10 may be included in vehicle 5. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Specifically, piston 138 may be coupled to crankshaft 140 via a piston displacement changing mechanism that moves the pistons closer to or further from the cylinder head, thus changing the size of combustion chamber 14. For example, crankshaft 140 may be configured as an eccentric shaft. In another example, an eccentric may be coupled to, or in the area of, a piston pin, the eccentric changing the displacement of the piston within the combustion chamber. Movement of the eccentric may be controlled by oil passages in the piston rod. It will be appreciated that still other mechanisms that mechanically alter the displacement of the piston within the combustion chamber may be used.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. The intake valve 150 and/or the exhaust valve 156 may be held partially or completely open at a constant lift during a deactivated cycle for the cylinder via an active decompression technology (ADT).

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a lambda ($\lambda$) value, that is, as a ratio of actual AFR to stoichiometry for a given mixture. Thus, a lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Exhaust passage 148 can receive exhaust gases from other cylinders of engine 10 in addition to cylinder 14. Exhaust gas sensor 128 is shown coupled to exhaust passage 148 upstream of emission control device 178 (e.g., also an emissions aftertreatment device). Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three-way catalyst (TWC), NOx trap, oxidation catalyst, selective reduction catalyst, various other emission control devices, or combinations thereof. When the emission control device 178 is the TWC, the TWC oxidizes CO and HC while reducing $NO_x$. In order to efficiently catalyze the redox reaction, emission control device 178 may include an oxygen storage material to both store excess oxygen and supply oxygen when additional oxygen is demanded. In one example, the oxygen storage material may be formed of high entropy rare earth metal oxides, e.g., a high entropy oxygen storage material, as described below with respect to FIG. 2.

Controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and exhaust temperature from an exhaust temperature sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller. For example, a position of the throttle plate 164 may be adjusted based on a signal from the EGO sensor 128 to adjust an amount of intake air delivered to the engine 10 based on the inferred AFR.

Non-transitory storage medium read-only memory 110 can be programmed with computer readable data representing instructions executable by processor 106 for performing the methods described below as well as other variants that are anticipated but not specifically listed.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

As described above, an exhaust system of a vehicle may include a three-way catalyst, e.g., a three-way catalytic converter, with a high entropy oxygen storage material. The high entropy oxygen storage material may treat exhaust gas at the three-way catalyst by storing and releasing oxygen in order to compensate for variations in an AFR of combustion at an engine, where the variations in AFR may affect an efficiency of redox reactions at the three-way catalyst.

For example, the three-way catalyst may perform oxidation and reduction reactions to convert undesirable combustion products present in exhaust gas, such as CO, HCs, and $NO_x$, to more biologically benign species. A suitable balance of oxidant and reductant amounts present in an emissions aftertreatment device is demanded to facilitate redox reactions. An oxidant/reductant balance in the emissions aftertreatment device may be affected by the AFR of combustion which may fluctuate relative to a target AFR set by a controller. As a result of the fluctuations in AFR, the catalytic reactions may not completely convert the combustion products and control of emissions may be reduced.

To address changes in the AFR, the emissions aftertreatment device may include at least one oxygen storage material in addition to the three-way catalyst. As described above, the oxygen storage material may buffer catalyst activity against AFR variations by providing an additional source of oxygen when the AFR decreases, e.g., below stoichiometry, and storing oxygen when the AFR increases. In conventional systems, the oxygen storage material may be a ceria-zirconia mixture, where cerium ions of the ceria enable the oxygen storage material to donate and store oxygen by changing oxidation state while zirconium ions of the zirconia stabilize a crystal structure of the oxygen storage material. The conventional oxygen storage material may further include small amounts, e.g., 1%-5%, of rare earth metal oxides to promote oxygen diffusion and stability of the material. The ceria-zirconia mixture may be prone to degradation upon repeated exposure to exhaust system conditions. An oxygen storage capacity and reactivity of the ceria-zirconia mixture may decrease while higher light-off temperatures may be demanded. Oxygen storage materials with greater oxygen storage capacity, higher activity, and increased robustness to environmental conditions are therefore desirable.

By incorporating the high entropy oxygen storage material into the emissions aftertreatment device, an internal entropy of the oxygen storage material may be increased relative to the ceria-zirconia mixture, which may increase a thermodynamic stability of the material and reduce thermal degradation. While the high entropy oxygen storage material may include cerium to reversibly bind oxygen in a manner similar to conventional oxygen storage materials, incorporation of additional metals in stoichiometrically equal quantities may maintain an oxygen storage capacity and reactivity of the oxygen storage material for a longer period of time. For example, the high entropy storage material may include at least 5 different metal oxides formed from either rare earth elements or metals with similar chemical properties to the rare earth elements, such as yttrium, scandium, hafnium, and zirconium. Furthermore, the material may include praseodymium and/or terbium in addition to or in place of cerium to effectively interact with oxygen in an exhaust gas stream.

Turning now to FIG. 2, it shows an embodiment of the emission control device 178 of FIG. 1. The emission control device 178 may include an outer housing 202 which may be formed of a durable, heat and chemical tolerant material, such as stainless steel or aluminum. Exhaust gas from the exhaust passage, e.g., the exhaust passage 148 of FIG. 1, may flow into the emission control device at a first end 204, carrying combustion products such as CO, HC, and $NO_x$. Upon flowing through at least one catalyst brick 206 of the emission control device 178, where the catalyst brick 206 is configured as a three-way catalyst, CO, HC, and $NO_x$ may chemically interact with the three-way catalyst in such a way that CO and HC may be oxidized to $CO_2$ and $H_2O$ while $NO_x$ may be reduced to $N_2$. The exhaust gas, with the converted combustion products, may exit the emission control device 178 through a second end 208.

In some examples, the emission control device 178 may include more than one catalyst brick 206, each catalyst brick 206 supporting a different catalyst thereon. For example, a first catalyst brick may include a first catalyst facilitating oxidation reactions and a second catalyst brick may include a second catalyst facilitating reduction reactions. In other examples, both the first and the second catalyst may be incorporated into a single catalyst brick. Furthermore, the catalyst brick 206 may include a catalyst substrate 210 on which a catalyst and an oxygen storage material may be supported. In one example, the catalyst substrate 210 may include a washcoat, as described further below. The catalyst substrate 210 may be shaped to allow the exhaust gas to flow therethrough while maximizing a surface area of the catalyst substrate 210 to increase contact between the exhaust gas and the catalyst. For example, the catalyst substrate 210 may have a honeycomb structure or some highly porous structure that allows numerous air flow passages to be formed along the catalyst substrate 210.

Further details of the catalyst brick 206 of FIG. 2 are provided with reference to FIGS. 3A-3C which depict diagrams of a first catalyst brick 300, a second catalyst brick 330, and a third catalyst brick 350, respectively, each of which may be examples of the catalyst brick 206 of FIG. 2. The catalyst bricks illustrated in FIGS. 3A-3C each include a catalyst substrate 310, similar to the catalyst substrate 210 of FIG. 2. The catalyst substrate 310 may be formed of a ceramic such as cordierite or aluminum titanate, for example, or it may be formed from a metal. Further, as described above, the catalyst substrate 310 may have a honeycomb configuration.

Turning first to FIG. 3A, the catalyst substrate 310 of the first catalyst brick 300 may be coated by a washcoat 302. The washcoat 302 may be a thin layer of material including one or more of a high entropy oxygen storage material, a precious metal catalyst such as Pt, Pd, or Rh, and additional metal oxides, such as alumina or ceria-zirconia and other metal oxides. For example, a thickness 304 of the washcoat 302 may be less than a thickness 306 of the catalyst substrate 210 and may be, as an example, between 15 μm to 60 μm thick. By including the high entropy oxygen storage material in the washcoat 302, the material may be arranged in close proximity to the catalyst, thereby able to readily adjust oxygen levels to facilitate catalytic reactions occurring thereat. The high entropy oxygen storage material may be incorporated into, for example, a slurry during fabrication of the washcoat 302 and deposited along with other constituents of the washcoat 302 over the catalyst substrate 310.

In other examples, the high entropy oxygen storage material may be included in more than one washcoat layer. A second embodiment of a catalyst brick 330 is illustrated in FIG. 3B, where the catalyst substrate 310 may be coated by one or more washcoat layers. The washcoat layers may have differing compositions and/or thicknesses. For example, the catalyst brick 330 may include a first washcoat 332 of a first thickness 334 and a second washcoat 336 of a second thickness 338. the second washcoat 336 layered over the first washcoat 332. The first thickness 334 may be different from the second thickness 338. For example, as shown in FIG. 3B, the second thickness 338 may be less than the first thickness 334. In other examples, however, the second thickness 338 may instead be less than the first thickness 334, or the thicknesses of the washcoat layers may be similar. In some instances, a total washcoat thickness, e.g., a sum of the first and the second thicknesses 334, 338 may be held at a set total thickness, such as between 15 μm to 60 μm and the individual thicknesses of the washcoat layers may be adjusted while adhering to the set total thickness. Furthermore, the total washcoat thickness may be greater than the thickness 306 of the catalyst substrate 310, as shown in FIG. 3B. However, in other examples, the total washcoat thickness may be similar to or less than the thickness 306 of the catalyst substrate 310.

The first and second washcoats 332, 336 may each include various constituents. A composition of the constituents in the washcoat layers may be different. For example, the second washcoat 336 may include a different precious metal catalyst not included in the first washcoat 332. For example, if the first washcoat 332 includes Pd, the second washcoat 332 may include Rh. In other examples, only one of the washcoat layers may include the precious metal catalyst. Additionally or alternatively, one or more of the washcoat may include additional metal oxides, such as alumina or ceria-zirconia and other metal oxides. In one example, one washcoat layer may include a precious metal catalyst and the other washcoat layer may include the additional metal oxides. In yet other examples, each washcoat layer may include both a precious metal catalyst and the additional metal oxides but the precious metal catalyst type and/or additional metal oxide species, as well as amounts of the constituents, may differ between the washcoat layers.

Furthermore, at least one of the washcoat layers may include the high entropy oxygen storage material. In some examples, both of the washcoat layers may include the high entropy oxygen material in similar or different quantities. In other examples, the high entropy oxygen storage material may be incorporated into each washcoat layer that includes a precious metal catalyst. In some instances, the high entropy oxygen storage material and the precious metal catalyst may be concentrated at outer surfaces of the catalyst brick 330, e.g., at the second washcoat layer 336 to maximize exposure of the material and catalyst to an exhaust gas stream flowing through the emissions aftertreatment device, while other, supporting materials may be embedded in the first washcoat layer 332.

In another example, a catalyst brick may include washcoat zones arranged according to a direction of exhaust gas flow through the emissions aftertreatment device. For example, a third embodiment of a catalyst brick 350 is shown in FIG. 3C, the catalyst brick 350 including at least one zoned washcoat layer. For example, similar to the catalyst brick 330 of FIG. 3B, the catalyst brick 350 of FIG. 3C may have more than one washcoat layer, including a first washcoat 352 with a first thickness 354 and a second washcoat 356 with a second thickness 358, the second washcoat 356 layered over the first washcoat 352. The thicknesses of the washcoat layers may be adjusted/selected as described above, with reference to FIG. 3B.

The first washcoat 352 may include a first zone 352a and a second zone 352b. The first zone 352a may be upstream of the second zone 352b according to a direction of exhaust gas flow, as indicated by arrow 360. In other words, exhaust gas may flow through the first zone 352a before flowing through the second zone 352b of the first washcoat 352.

As described above, the high entropy oxygen storage material may be included in one or more of the washcoat layers and may vary in concentration, e.g., a compositional amount, between the washcoat layers when included in each of the washcoat layers. Additionally, when the high entropy oxygen storage material is incorporated into the first washcoat 352, a composition of each of the first zone 352a and the second zone 352b may be different. For example, the first zone 352a may include a first type of catalyst (e.g., precious metal catalyst) and the high entropy oxygen storage material while the second zone 352b includes other, additional constituents, e.g., additional metal oxides. In another example, the first zone 352a may include the first type of catalyst with the high entropy oxygen storage material and the second zone 352b may include a second, different type of catalyst with the high entropy oxygen storage material. As another example, the first zone 352a may include the high entropy oxygen storage material, as well as the additional metal oxides, and the second zone 352b may include a catalyst without the high entropy storage material. In yet another example, the first zone 352a may include both the high entropy oxygen storage material and a catalyst and the second zone 352b may include high entropy oxygen storage material without the catalyst, with the additional metal oxides included in at least one of the zones. As such, numerous compositional variations are possible and may be selected according to a desired effect.

Further, it will be appreciated that various washcoat configurations incorporating the high entropy oxygen storage material have been contemplated in addition to those depicted in FIGS. 3A-C are possible. As well, it will be noted that the depiction of the relative thicknesses of the washcoat layer(s) and the catalyst substrate are non-limiting examples and the relative thicknesses of the washcoat layer(s) and the catalyst substrate may vary without departing from the scope of the present disclosure.

A material of the washcoat of the catalyst brick may have a high specific surface area and high thermal stability. The high specific surface area, as well as porosity, allows the washcoat to disperse the catalyst along surfaces of the catalyst brick, thereby maximizing contact between the catalyst and exhaust gas. The washcoat may be deposited on and bonded to surfaces of the catalyst substrate, for example.

As described above, the washcoat may include the high entropy oxygen storage material, in addition to other washcoat components described above. By incorporating both the catalyst and the high entropy oxygen storage material in the washcoat, oxygen may be readily provided or stored in close proximity to the catalyst in response to changes to an AFR of an engine. In other examples, the high entropy oxygen storage material may be included in multiple layers or zones, as shown in FIGS. 3B-3C. Unlike conventional oxygen storage materials, such as solid solutions of cerium oxide and zirconium oxide, which lose oxygen storage capacity when heated to high temperatures, e.g., above 900° C., the high entropy oxygen storage material may demonstrate higher thermal stability. A thermal robustness of the high entropy oxygen storage material may result from incorporation of at least 5 different metal ions in substantially equal proportions, e.g., equal molar ratios, where "substantially" represents deviations of 10% or less. By forming the high entropy oxygen storage material from at least 5 metal ions, an internal entropy of the material is increased, e.g., relative to conventional materials. For example, the internal entropy may be 1.5 to 3 times greater than the internal entropy of a conventional oxygen storage material comprised predominantly of ceria and zirconia, thus imparting the high entropy oxygen storage material with enhanced thermodynamic stability at high temperatures.

The high entropy oxygen storage material may be any single phase (i.e., having a single crystal structure) combination of 5 or more rare earth metal oxides in substantially equal molar amounts, where "substantially" indicates ±0.10 mole fraction. The high entropy oxygen storage material may include at least one metal known to form a metal oxide capable of changing oxidation state in response to changes in chemical environment, thereby providing chemical reactivity and oxygen storage that are of use in emissions control. As such, the high entropy oxygen storage material may include at least one of the following rare earth metals: Ce, Pr, or Tb. Additional elements included in the high entropy oxygen storage material may also be selected from the rare earth metals including: La, Sm, Eu, Gd, Dy, Ho, Er, Yb, and Lu. Additionally, metals chemically similar to the rare earths may be included, such as: Y, Zr, Sc, and Hf. Chemically similar metals may demonstrate structural compatibility with oxides of Ce, Pr, and Tb, including ability to incorporate into a cubic or tetragonally distorted oxide lattice, ability to support a presence of oxygen vacancies or defect sites in the crystal lattice, ability to support diffusion of oxygen ions through the crystal lattice, and high thermal stabilities and melting points in oxide form. As such a mole ratio of the of the rare earth metal oxides in the high entropy oxygen storage material may be substantially similar. For example, the high entropy oxygen storage material may be an oxide of a 1:1:1:1:1:1 ratio of La, Ce, Pr, Nd, Tb, and Yb, having chemical formula $La_{0.166}Ce_{0.166}Pr_{0.166}Nd_{0.166}Tb_{0.166}Y_{0.166}O_x$, where x may be between 1.5 and 2.

Figure 7:
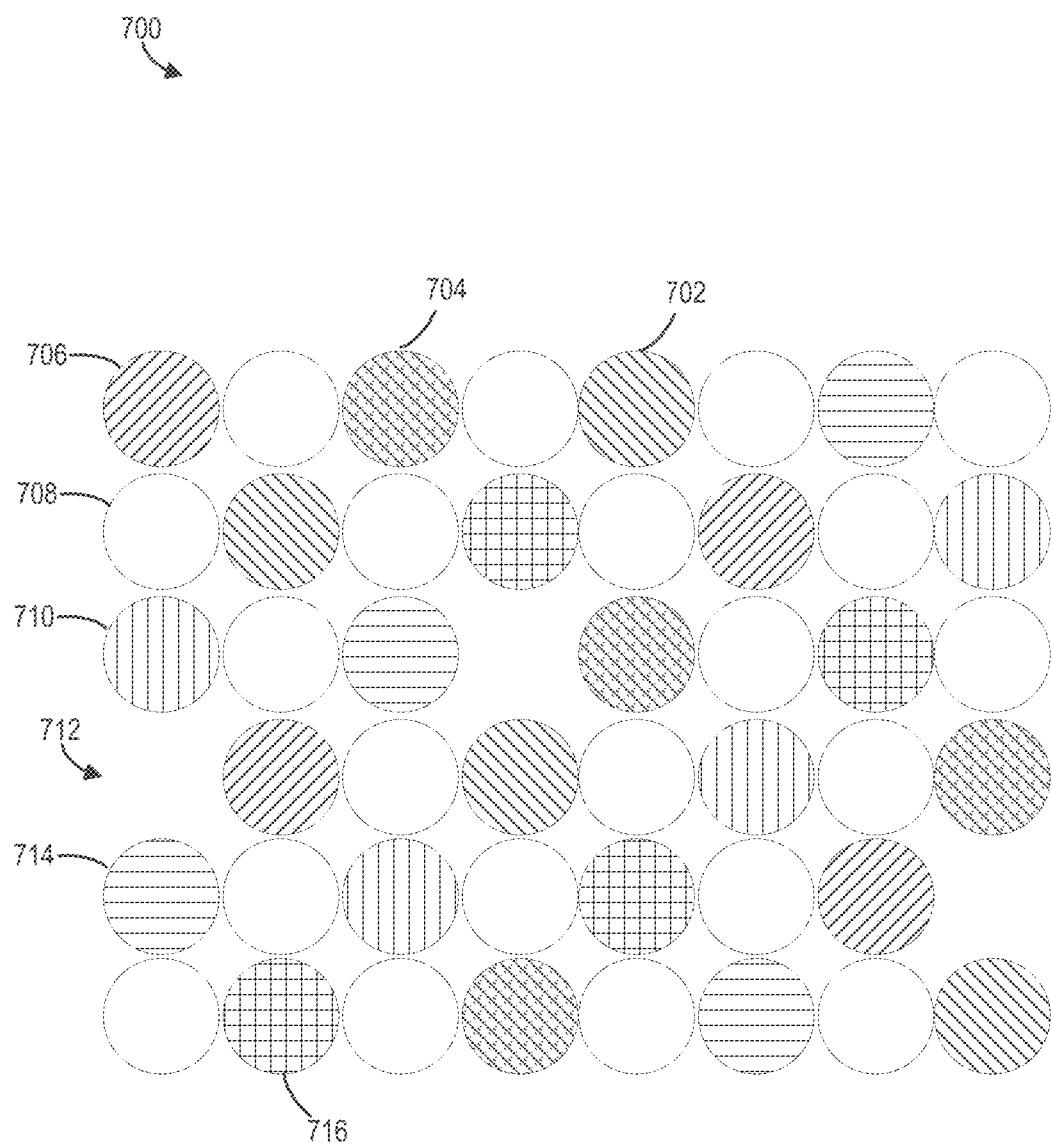
FIG. 7 shows an example of an illustration of a 2D crystal lattice structure for the high entropy rare earth metal oxide oxygen storage material.

An illustration of an example two-dimensional (2D) crystal structure representation 700 of a high entropy oxygen storage material is shown in FIG. 7. It will be appreciated that the 2D crystal structure representation 700 is a general and non-limiting example of the locations and distributions of ions in any particular high entropy oxygen storage material formulation and is shown to provide a visual depiction of how elements of the high entropy oxygen storage material may be distributed. Various rare earth (or chemically similar) metal atoms 702, 704, 706, 710, 714, 716 may be distributed randomly throughout a crystal structure of the high entropy oxygen storage material. Oxygen atoms 708 of the high entropy oxygen storage material may be distributed between the metal atoms. The 2D crystal structure representation 700 also includes oxygen vacancies 712 which may be present in the crystal structure and may enable storage of oxygen in the crystal structure.

Figure 8:
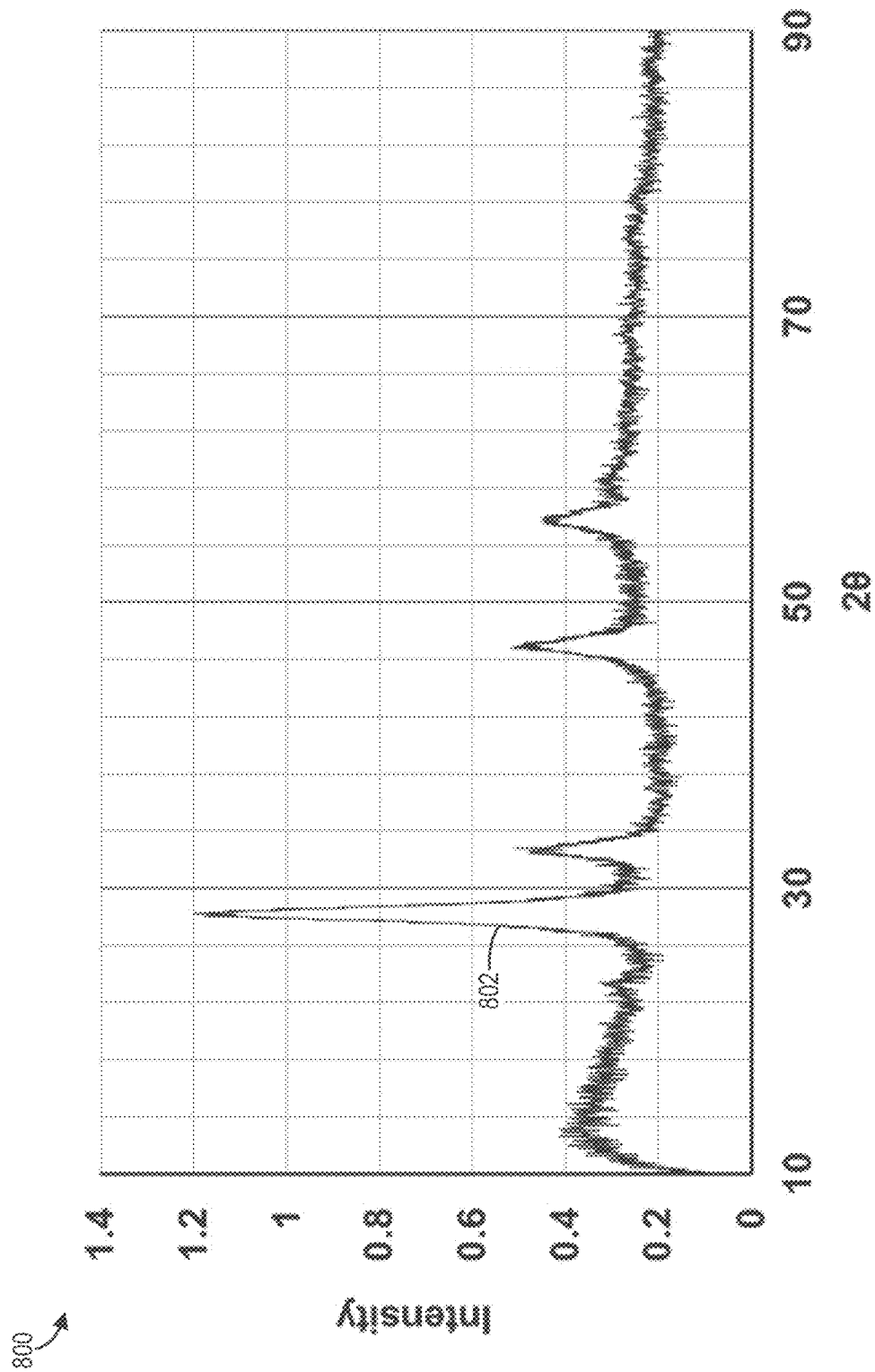
FIG. 8 shows a powder x-ray diffraction spectrum of the high entropy rare earth metal oxide oxygen storage material.

A three-dimensional (3D) crystal structure of the high entropy oxygen storage material may be characterized by a powder XRD spectrum, as shown in graph 800 of FIG. 8. Peak intensity is shown along the y-axis of graph 800, relative to diffraction angle along the x-axis. Plot 802 of graph 800 is a diffraction pattern of a high entropy oxygen storage material having a chemical formula of $La_{0.166}Ce_{0.166}Pr_{0.166}Nd_{0.166}Tb_{0.166}Y_{0.166}O_x$, where x may be between 1.5 and 2. Position of peaks of plot 802, and their relative intensities, correspond to peak position and peak intensities of a reference material of $CeO_2$. The peaks depicted into plot 802 are not split or doubled, therefore confirming that the high entropy oxygen storage material is formed as a single crystalline phase.

The high entropy oxygen storage material may be prepared, in one example, by co-precipitation of nitrate salts of the selected metals according to a target ratio in the presence of citric acid. Once precipitated, the material may be further calcined and dried in an oven at high temperature (for example, 700° C.) resulting in a single phase ceramic material. However, other methods for preparing the high entropy oxygen storage material are possible, including sol-gel preparation from metal alkoxides or chlorides, grinding and co-milling of metal oxides followed by calcination, spray-dry precipitation, or "solution combustion synthesis" involving adjuvants such as hydrazinecarboxylates. While alternate methods of preparation may alter the surface areas or textural properties of the high entropy oxygen storage material, but does not alter its formation as a mixed single phase oxide stabilized by high internal entropy. The high entropy oxygen storage material, as described above, may demonstrate higher catalytic activity compared to conventional ceria-zirconia oxygen storage materials stabilized by a less than five metals in equal proportions. A comparison of the catalytic abilities of the materials with respect to CO oxidation is shown in FIG. 4.

FIG. 4 shows a graph 400 plotting oxygen storage material efficiency for oxidizing CO as a function of feedgas temperature. A concentration of CO in ppm is shown along the y-axis and feedgas temperature, in ° C., is shown along the x-axis. The feedgas is a mixture of gases similar to gases exhausted after combustion of air/fuel mixtures. The results shown in graph 400 represent CO levels remaining in the feedgas after passing through emission control devices configured with different oxygen storage materials, including a high entropy oxygen storage material. The oxygen storage materials are catalyzed with 2 wt % palladium. The oxygen storage materials include a set of reference materials, indicated by bracket 402 and the high entropy storage material, shown as plot 404. The reference materials are mixtures of primarily ceria and zirconia, doped with 10% or less of rare earth metals. The feedgas temperature is increased over the duration of the experiment. As such, the x-axis of graph 400 also represents elapsed time which increases to the right.

At point 406 along the x-axis, CO is introduced to the emission control devices. The CO levels measured downstream of the emission control devices all rise. However, the rise in CO levels for the high entropy oxygen storage material shows a delay, relative to the reference materials, before the CO levels rise in the feedgas stream. The delay illustrated by the high entropy oxygen storage material indicates a higher oxygen storage capacity of the high entropy oxygen storage material, allowing the high entropy oxygen storage material to oxidized CO for a longer period of time than the reference materials.

Furthermore, the results shown in graph 400 indicate a higher rate of a water gas shift (WGS) reaction by the high entropy oxygen storage material. The WGS is the reaction is the reaction of CO with water ($H_2O$) to produce hydrogen gas ($H_2$). As such, the WGS reaction does not use the oxygen stored in the oxygen storage material and promotion of the WGS improves efficiency of the oxygen storage material for treating CO emissions.

The enhanced ability of the high entropy oxygen storage material to promote the WGS reaction is demonstrated by CO concentration plateau. The reference materials reach a plateau at a higher CO concentration than the high entropy oxygen storage materials (e.g., between about 3000-3500 ppm for the reference materials versus about 2000 ppm for the high entropy oxygen storage material). As such, the WSG occurs to a greater extent in the high entropy oxygen storage material. Thus, the rare earth metal oxides incorporated into an oxygen storage material for an emission control device show higher performance than ceria/zirconia-based oxygen storage materials.

High entropy oxygen storage materials may also increase a long term stability of the three-way catalyst which may be repeatedly subjected to harsh conditions. Performances of a high entropy oxygen storage material and reference oxygen storage materials, after accelerated aging of the oxygen storage materials, are illustrated in FIGS. 5-6B, where the accelerated aging is achieved by exposing the oxygen storage materials to high temperatures, such as 1100° C., for a relatively short period of time, such as 38 hours. Each of the oxygen storage materials are incorporated into an emission control device including one of the oxygen storage materials and catalyzed with 2 wt % palladium.

Turning now to FIG. 5, a graph 500 depicts a measured $\lambda$, relative to feedgas temperature, of a feedgas flow measured downstream of the emission control devices, e.g., after the feedgas passes through the emission control devices, as measured by a universal exhaust gas sensor (UEGO) (similar to EGO 128 shown in FIG. 1.) as a function of feedgas temperature. As described above with respect to FIG. 4, an increase in feedgas temperature also corresponds to elapsed time from left to right along the x-axis. Exposure of the emission control devices to feedgas was cycled between a rich feedgas (e.g., $\lambda$=0.985) with 1% CO for a two minute duration and a lean feedgas ($\lambda$=1.015) with 0.5% $O_2$ for a two minute duration. The feedgas was ramped from 100° C. to 600° C. at a rate of 2.5° C./min. Graph 500 shows effects of the emission control devices on downstream $\lambda$ at around 500° C.

The emission control device includes a first material incorporating a high entropy oxygen storage material, $La_{0.166}Ce_{0.166}Pr_{0.166}Nd_{0.166}Tb_{0.166}Y_{0.166}O_x$ (where 1.5<x<2), represented by plot 502. The emission control device also includes a second material incorporating a reference oxygen storage material, $La_{0.5}Ce_{0.35}Zr_{0.50}O_x$ (where 1.5<x<2), represented by plot 504.

At a first region 506 of graph 500, e.g., a duration of time of about 2 minutes, corresponding to an increase in feedgas temperature of about 3.5° C., the emission control devices are exposed to the lean feedgas (e.g., $\lambda$=1.015). The measured $\lambda$ of the feedgas stream downstream of high entropy oxygen storage material (plot 502) is lower, e.g., more rich, than the measured $\lambda$ of the feedgas stream downstream of the reference oxygen storage material (plot 504). Additionally, the near-plateau and slow rise in measured $\lambda$ above 1 in region 506 downstream of the high entropy oxygen storage material (plot 502) indicates a prolonged period of removal of oxygen from the feedgas by absorption of oxygen into the high entropy oxygen storage material, thereby demonstrating an enhanced ability of the high entropy oxygen storage material for storing excess oxygen under lean feed conditions compared to the reference ceria-zirconia-based material (plot 504).

In a second region 508, following the first region 506, the emission control devices are exposed to the rich feedgas (e.g., $\lambda$=0.985). As shown in dashed region 510, the measured $\lambda$ downstream of the high entropy oxygen storage material, rapidly decreases to about $\lambda$=1, and maintaining a plateau for a period of time (e.g., 10 seconds) before decreasing to a rich $\lambda$ value. The measured $\lambda$ downstream of the reference oxygen storage material, however, does not exhibit the plateau shown in dashed region 510 and instead drops rapidly to a rich $\lambda$ value. Furthermore, the measured $\lambda$ downstream of the high entropy oxygen storage material reaches and plateaus at a lower $\lambda$ value than the measured $\lambda$ downstream of the reference oxygen storage material.

The presence of the plateau at about $\lambda$=1 in region 508 downstream of the high entropy oxygen storage material indicates a release of oxygen from the high entropy oxygen storage material to compensate for low oxygen in the feedgas, thereby demonstrating an enhanced ability of the high entropy oxygen storage material for storing and providing oxygen under rich conditions compared to the reference oxygen storage material. Furthermore, the lower, e.g., richer, $\lambda$ value measured downstream of the high entropy oxygen storage material relative to the reference oxygen storage material in the second region 508 indicates occurrence of the WGS reaction at the high entropy oxygen storage material. The $\lambda$ of the feedgas downstream of the high entropy oxygen storage material is artificially low (e.g., less than 0.985) in the second region 508, indicative of a presence of hydrogen gas which interferes with the UEGO sensor. The hydrogen gas is a product of the WGS reaction and the artificially low measured $\lambda$ downstream of the high entropy oxygen storage material confirms the promotion of the WGS reaction. The measured $\lambda$ downstream of the reference oxygen storage material however, remains above the $\lambda$ of the feedgas (e.g., above 0.985), indicating that the WGS reaction does not occur. Promoting the WGS reaction may be an additional benefit of the high entropy oxygen storage material as CO can be oxidized without relying on oxygen to be present, thus providing greater control of CO emissions, as described above. The results illustrated in graph 500 demonstrates the ability of the high entropy oxygen storage material to store oxygen more effectively than the reference oxygen storage material, even after aging.

Turning now to FIGS. 6A-6B, graphs 600 and 650 show percent conversion efficiency for various combustion products along the y-axes relative to lambda along the x-axis. Graph 600 of FIG. 6A illustrates results for an emission control device catalyzed with 2 wt % Pd and incorporating a reference oxygen storage material, $La_{0.05}Y_{0.05}Ce_{0.45}Zr_{0.45}O_x$ (where 1.5<x<2), aged as described above. A CO conversion efficiency is given by plot 602, a $NO_x$ conversion efficiency is given by plot 604 and a HC conversion efficiency is given by plot 606. Graph 650 of FIG. 6B illustrates results for an emission control device catalyzed with 2 wt % Pd and incorporating the high entropy oxygen storage material, $La_{0.166}Ce_{0.166}Pr_{0.166}Nd_{0.166}Tb_{0.166}Y_{0.166}O_x$ (where 1.5<x<2), also aged as described above. The CO conversion efficiency is given by plot 652, the $NO_x$ conversion efficiency is given by plot 654, and the HC conversion efficiency is given by plot 656.

The emission control devices were tested by sweeping a set $\lambda$ value of the feedgas across a range near stoichiometry, e.g., from 0.96 to 1.02. In addition, modulation of the set $\lambda$ value at a frequency of 0.5 Hz is superimposed to stress a rapid response of the respective oxygen storage material, rather than total capacity.

Of the different combustion products treated by the emission control devices, the $NO_x$ conversion efficiencies of the oxygen storage materials show the greatest difference between the results shown in FIG. 6A versus the results shown in FIG. 6B. The high entropy oxygen storage material may reduce at least 50% of the $NO_x$ gas. For example, plot 654 of FIG. 6B reaches approximately 95% between AFRs of 0.96 to 1, whereas plot 604 of FIG. 6A reaches and does not exceed about 85%. For the CO and HC conversion efficiencies, the high entropy oxygen storage material shows comparable results to the reference oxygen storage material, converting both CO and HC at high efficiencies across a wide range of AFRs.

In this way, a high efficiency oxygen storage material for use in a three-way catalyst is provided. The high entropy oxygen storage material, may include stoichiometrically equivalent amounts of at least five different rare earth (or chemically and/or physically similar) metal oxides, and may demonstrate improved performance, including increased oxygen storage capacity over a range of AFRs, ability to promote a WSG reaction, and higher conversion efficiencies for combustion products, relative to conventional oxygen storage material formed primarily of ceria and zirconia. Additionally, the performance of the high entropy oxygen storage material may be maintained over a longer period of time. Further, the high entropy oxygen storage material may be applied as a washcoat to a catalyst support thereby allowing the high entropy oxygen storage material to be readily incorporated into an emissions aftertreatment device.

FIGS. 2-3C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As described above, the terms "substantially" or "approximately" are construed to mean plus or minus five percent of the range unless otherwise specified.

Note that the example controls included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The disclosure also provides support for an emissions aftertreatment device, comprising: a catalyst, a high entropy oxygen storage material formed of at least five metal oxides in equal molar ratios, the at least five metal oxides including one or more rare earth metals. In a first example of the system, the one or more rare earth metals includes at least one of cerium, praseodymium, and terbium, and wherein the at least five metal oxides include five of lanthanum, cerium, praseodymium, neodymium, samarium, europium, gadolinium, terbium, dysprosium, holmium, erbium, thulium, ytterbium, lutetium, scandium, yttrium, hafnium, and zirconium. In a second example of the system, optionally including the first example, the equal molar ratios includes variations between each of the equal molar ratios up to 10%. In a third example of the system, optionally including one or both of the first and second examples, the at least five metal oxides are incorporated into the high entropy oxygen storage material as ceramic materials. In a fourth example of the system, optionally including one or more or each of the first through third examples, the at least five metal oxides form a single crystalline phase. In a fifth example of the system, optionally including one or more or each of the first through fourth examples, the catalyst is a three-way catalyst configured to chemically interact CO, NOx, and hydrocarbons (HC) in exhaust gas. In a sixth example of the system, optionally including one or more or each of the first through fifth examples, the high entropy oxygen storage material has an internal entropy between 1.5 to 3 times higher than an oxygen storage material formed of less than five metal oxides, the less than five metal oxides including ceria and zirconia as majority constituents. In a seventh example of the system, optionally including one or more or each of the first through sixth examples, the high entropy oxygen storage material is incorporated into at least one washcoat of the emissions aftertreatment device.

The disclosure also provides support for an oxygen storage material for an emissions aftertreatment device, comprising: a single phase ceramic material formed of at least five metal oxides in equal molar proportions, the single phase ceramic material including one or more of cerium, praseodymium, and terbium. In a first example of the system, the single phase ceramic material further includes one or more rare earth metals including lanthanum, neodymium, samarium, europium, gadolinium, dysprosium, holmium, erbium, thulium, and lutetium. In a second example of the system, optionally including the first example, the single phase ceramic material further includes one or more metals having similar chemical properties to the one or more rare earth metals, including scandium, yttrium, hafnium, and zirconium. In a third example of the system, optionally including one or both of the first and second examples, more than 50% of NOx in exhaust gas is reduced by the emissions aftertreatment device when the single phase ceramic material is combined with a catalyst. In a fourth example of the system, optionally including one or more or each of the first through third examples, the single phase ceramic material facilitates a water gas shift reaction to oxidize CO. In a fifth example of the system, optionally including one or more or each of the first through fourth examples, the single phase ceramic material provides oxygen for oxidation of hydrocarbons and CO when an air-to-fuel ratio of an engine is rich, the engine flowing exhaust gas to the emissions aftertreatment device. In a sixth example of the system, optionally including one or more or each of the first through fifth examples, the single phase ceramic material stores oxygen when an air-to-fuel ratio of an engine is lean, the engine flowing exhaust gas to the emissions aftertreatment device.

The disclosure also provides support for a three-way catalytic converter for a vehicle, comprising: a washcoat supported on a substrate, the washcoat including, at least one catalyst, and a high entropy oxygen storage material formed of a single phase of equal molar amounts of at least five metal oxides, the at least five metal oxides including rare earth metals and metals demonstrating structural compatibility with oxides of cerium, praseodymium, and terbium. In a first example of the system, the metals demonstrating structural compatibility with oxides of cerium, praseodymium, and terbium includes scandium, yttrium, hafnium, and zirconium. In a second example of the system, optionally including the first example, the at least five metal oxides includes one or more of cerium, praseodymium, and terbium. In a third example of the system, optionally including one or both of the first and second examples, the washcoat further includes alumina and/or ceria-zirconia. In a fourth example of the system, optionally including one or more or each of the first through third examples, the substrate is formed of one of cordierite, aluminum titanate, or a metal.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An emissions aftertreatment device, comprising:
   a catalyst, wherein the catalyst is a three-way catalyst configured to chemically interact CO, NOx, and hydrocarbons (HC) in exhaust gas;
   a high entropy oxygen storage material in addition to the catalyst, wherein the high entropy oxygen storage material is formed of metal oxides including a 1:1:1:1:1:1 molar ratio of La, Ce, Pr, Nd, Tb, and Yb.

2. The emissions aftertreatment device of claim 1, wherein the high entropy oxygen storage material further includes one or more of samarium, europium, gadolinium, dysprosium, holmium, erbium, thulium, ytterbium, lutetium, scandium, yttrium, hafnium, and zirconium.

3. The emissions aftertreatment device of claim 1, wherein the equal molar ratios includes variations between each of the equal molar ratios up to 10%.

4. The emissions aftertreatment device of claim 1, wherein the metal oxides are incorporated into the high entropy oxygen storage material as ceramic materials.

5. The emissions aftertreatment device of claim 1, wherein the metal oxides form a single crystalline phase.

6. The emissions aftertreatment device of claim 1, wherein the catalyst is a precious metal catalyst.

7. The emissions aftertreatment device of claim 1, wherein the high entropy oxygen storage material has an internal entropy between 1.5 to 3 times higher than an oxygen storage material formed of fewer than the metal oxides, the fewer than the metal oxides including ceria and zirconia as majority constituents.

8. The emissions aftertreatment device of claim 1, wherein the high entropy oxygen storage material is incorporated into at least one washcoat of the emissions aftertreatment device.

9. An oxygen storage material for an emissions aftertreatment device, comprising:
   a single phase ceramic material formed of at least five metal oxides in equal molar proportions, the single phase ceramic material is an oxide comprising a 1:1:1:1:1:1 molar ratio of La, Ce, Pr, Nd, Tb, and Yb.

10. The oxygen storage material of claim 9, wherein the single phase ceramic material further includes one or more rare earth metals including samarium, europium, gadolinium, dysprosium, holmium, erbium, thulium, and lutetium.

11. The oxygen storage material of claim 10, wherein the single phase ceramic material further includes one or more metals having similar chemical properties to the one or more rare earth metals, including scandium, yttrium, hafnium, and zirconium.

12. The oxygen storage material of claim 9, wherein more than 50% of NOx in exhaust gas is reduced by the emissions aftertreatment device when the single phase ceramic material is combined with a catalyst.

13. The oxygen storage material of claim 9, wherein the single phase ceramic material provides oxygen for oxidation of hydrocarbons and CO when an air-to-fuel ratio of an engine is rich, the engine flowing exhaust gas to the emissions aftertreatment device.

14. The oxygen storage material of claim 9, wherein the single phase ceramic material stores oxygen when an air-to-fuel ratio of an engine is lean, the engine flowing exhaust gas to the emissions aftertreatment device.

15. A three-way catalytic converter for a vehicle, comprising:
a washcoat supported on a substrate, the washcoat including:
a first zone and a second zone, wherein exhaust gas flows through the first zone before flowing through the second zone, wherein a composition of the first zone and the second zone is different, and wherein the first zone and/or the second zone include:
at least one catalyst; and
a high entropy oxygen storage material formed of a single phase of equal molar amounts of metal oxides, the metal oxides including a 1:1:1:1:1:1 molar ratio of La, Ce, Pr, Nd, Tb, and Yb.

16. The three-way catalytic converter of claim 15, wherein the washcoat further includes alumina and/or ceria-zirconia, and wherein the washcoat is a first washcoat and the first zone is upstream of the second zone relative to a direction of exhaust gas flow, further comprising a second washcoat layered over each of the first zone and the second zone of the first washcoat.

17. The three-way catalytic converter of claim 15, wherein the substrate is formed of one of cordierite, aluminum titanate, or a metal.

* * * * *